United States Patent [19]

Takeshita

[11] Patent Number: 4,605,705
[45] Date of Patent: Aug. 12, 1986

[54] HEAT RESISTANT SULFUR-MODIFIED POLYCHLOROPRENE COPOLYMERS

[75] Inventor: Tsuneichi Takeshita, Chadds Ford, Pa.

[73] Assignee: E. I. du Pont de Nemours and Company, Wilmington, Del.

[21] Appl. No.: 648,594

[22] Filed: Sep. 10, 1984

[51] Int. Cl.[4] .......................... C08F 8/00; C08F 36/18; C08L 11/02
[52] U.S. Cl. .................................. 525/330.9; 526/295
[58] Field of Search ...................... 525/330.9; 526/295

[56] References Cited

U.S. PATENT DOCUMENTS

| | | | |
|---|---|---|---|
| 3,311,601 | 3/1967 | Conley | 528/493 |
| 3,378,538 | 4/1968 | Sparks | 260/92.3 |
| 3,397,173 | 8/1968 | Collette et al. | 260/45.9 |
| 3,507,825 | 4/1976 | Paris | 525/330.9 |
| 3,988,506 | 10/1976 | Dohi et al. | 526/218 |
| 4,076,927 | 2/1978 | Shimizu et al. | 526/295 |
| 4,124,754 | 11/1978 | Miller | 526/220 |
| 4,482,676 | 11/1984 | Musch et al. | 526/295 |

OTHER PUBLICATIONS

Journal of Polymer Science, vol. XVIII, pp. 227–234 (1955) by Maynard et al.
Rubber Chemistry and Technology, vol. 50, pp. 49–62 (1977) by Coleman, Tabb and Brame.
Rubber Chemistry and Technology, vol. 51, No. 4, pp. 668–676, by Coleman and Brame.

*Primary Examiner*—Joseph L. Schofer
*Assistant Examiner*—Peter F. Kulkosky

[57] ABSTRACT

A heat resistant sulfur-modified polychloroprene copolymer of 2-chloro-1,3-butadiene and 2,3-dichloro-1,3-butadiene characterized in that said polychloroprene has a Mooney viscosity ML 1+4' (100° C.) of from about 25–75, contains from about 3–25% by weight of units derived from 2,3-dichloro-1,3-butadiene, and of the units derived from 2-chloro-1,3-butadiene, 92–96% by weight of said units have a 1,4-trans configuration, said polychloroprene copolymer being curable with 4 parts MgO and 5 parts ZnO per 100 parts of copolymer at about 160° C. for 30 minutes to yield a vulcanizate having a tensile strength of at least 10 MPa.

9 Claims, No Drawings

HEAT RESISTANT SULFUR-MODIFIED POLYCHLOROPRENE COPOLYMERS

BACKGROUND OF THE INVENTION

The present invention is directed to a novel heat resistant polychloroprene copolymer and process for its preparation.

Polychloroprene prepared by the polymerization of chloroprene in the presence of a mercaptan chain-terminator, often referred to as type-W neoprene, has excellent heat resistance and compression set resistance, which are characteristics that are desirable for automotive power transmission belts, but, unfortunately, such polychloroprene cannot be used in dynamic applications because the cured elastomer typically contains only monosulfide linkages. When the polychloroprene containing monosulfide linkages is subjected to flexing, the elastomer fails rapidly because of its poor dynamic properties. Polychloroprenes that are "sulfur-modified", often referred to as type-G neoprene, yield cured elastomers that are especially useful for dynamic applications, such as power transmission belts, including V-belts for under-the-hood automotive applications. The sulfur-modified polychloroprenes are prepared by polymerizing chloroprene (2-chloro-1,3-butadiene) in an aqueous emulsion system in the presence of elemental sulfur. The sulfur becomes incorporated in the polymer chain in the form of polysulfide linkages. Some of the polysulfide linkages normally are cleaved chemically after polymerization to yield polymers having viscosities suitable for processing. This cleavage step is customarily called peptization. These sulfur-modified polychloroprene elastomers are especially useful for dynamic applications such as power transmission belts and timing belts. Unfortunately, the sulfur-modified type-G neoprene elastomers have poorer heat resistance than the type-W neoprene elastomers. Additional components, such as antioxidants and antiozonants, have been added to the sulfur-modified polychloroprene to improve its heat resistance and retard the onset of hardness but further improvement by altering formulations based on presently available sulfur-modified polychloroprene elastomers does not appear likely. The increase in under-the-hood temperatures resulting from higher engine operating temperatures and front wheel drive engine configurations have heightened the need for a more heat resistant sulfur-modified polychloroprene for dynamic applications such as power transmission belts.

SUMMARY OF THE INVENTION

The present invention is directed to a novel polychloroprene copolymer that has improved heat resistance due to a modification in its chemical structure and a process for the manufacture thereof. The heat resistant sulfur-modified polychloroprene copolymer having a calculated Mooney viscosity ML 1+4' (100° C.) of from about 25-75, preferably 35-55, is prepared by a process which comprises (I) emulsion polymerizing a mixture of 2-chloro-1,3-butadiene and 2,3-dichloro-1,3-butadiene to a total conversion of from about 65-85% by weight and at a temperature (T) in the range of from about 273-298K, said 2,3-dichloro-1,3-butadiene being employed in an amount of at least X parts to 20 parts per 100 parts 2-chloro-1,3-butadiene plus 2,3-dichloro-1,3-butadiene wherein $$X = 48.734 - 0.15325 K, \quad (1)$$

said calculated Mooney viscosity of the resulting polychloroprene copolymer within the range of 25-75 being obtained by employing amounts of from 0.1-0.62 parts elemental sulfur (S), up to 1.0 part diisopropyl xanthogen disulfide (P) or an equivalent amount of a dialkyl xanthogen disulfide, and 2,3-dichloro-1,3-butadiene (A), said (S), (P) and (A) expressed as parts per 100 parts of 2-chloro-1,3-butadiene plus 2,3-dichloro-1,3-butadiene, at a given temperature of polymerization (T), expressed by the following equation:

$$ML\ 1 + 4'\ (100°\ C.) = \quad (2)$$

$$(11129.1)e^{(-3.97385S - 2.34837P - .0138807T + .0281227A)},$$

[wherein e is the Napierian base, having an approximate value of 2.7183], and (II) peptizing the resulting polychloroprene copolymer latex to at least 60% of the theoretical maximum.

The resulting novel heat resistant sulfur-modified polychloroprene copolymer of 2-chloro-1,3-butadiene and 2,3-dichloro-1,3-butadiene is characterized as having a Mooney viscosity ML 1+4'(100° C.) of from about 25-75, preferably 35-55, contains from about 3-25% by weight of units derived from 2,3-dichloro-1,3-butadiene, and of the units derived from 2-chloro-1,3-butadiene, 92-96% by weight of said units have a 1,4-trans configuration, said polychloroprene copolymer being curable with 4 parts of magnesium oxide and 5 parts of zinc oxide per 100 parts of copolymer at about 160° C. for 30 minutes to yield a vulcanizate having a tensile strength of at least 10 MPa.

DETAILED DESCRIPTION OF THE INVENTION

The polymers of the present invention are prepared by substantially conventional emulsion polymerization procedures except for the temperatures employed and the amounts of reactants used. These exceptions are defined by the equations and limitations given above.

The polymerization is carried out in an aqueous emulsion using any of the conventional free radical polymerization catalysts. These include alkali metal or ammonium ferricyanides and peroxy compounds such as alkali metal or ammonium persulfates, hydrogen peroxide, cumene hydroperoxide, and dibenzoyl peroxide. In order to provide an acceptably high rate of polymerization at the low temperatures used in this invention it is usually desirable to employ reducing agents such as sodium formaldehyde sulfoxylates or sodium hydrosulfite in combination with the free radical catalyst.

Any of the conventional emulsifying agents may be used in preparing the monomer emulsion. These include the water-soluble salts, particularly the sodium, potassium, or ammonium salts, of compounds of the following types: long-chain fatty acids; rosins or rosin derivatives, such as wood rosin, tall oil rosin, disproportionated rosin, or partially polymerized rosin; higher alcohol sulfates; arylsulfonic acids, such as nonylbenzenesulfonic acid; and formaldehyde condensates of arylsulfonic acids, such as the condensation product of formaldehyde and naphthalene sulfonic acid.

The concentration of organic monomer present in the aqueous emulsion is not critical. In general, 30 to 60 percent, by weight, based on the total weight of the emulsion, is the range of concentrations of organic monomers used in the preparation of the polymer.

It is preferred to use in the polymerization process pH's in the alkaline ranges, as is customary in the preparation of sulfur-modified chloroprene copolymers. The polymerization must be carried out between 273–298K, preferably between 283–293K. The temperature used in conducting the process can be independently selected. The temperature selected determines the minimum amount of 2,3-dichloro-1,3-butadiene which can be used in the process, by virtue of equation (1), identified above. The amount of 2,3-dichloro-1,3-butadiene used is between X and 20 parts per 100 parts of 2-chloro-1,3-butadiene plus 2,3-dichloro-1,3-butadiene, preferred amounts of 2,3-dichloro-1,3-butadiene are from 7–15 parts per 100 parts said chlorobutadiene monomers. It follows from equation (2), identified above, that to a lesser extent the temperature selected influences the amounts of sulfur and dialkyl xanthogen disulfide which must be employed to yield a polymer of a given Mooney viscosity.

Polymerization is carried out in an inert atmosphere free of oxygen, such as an atmosphere of nitrogen or other inert gas, which is customary procedure.

The percent conversion of said chlorobutadiene monomers is usually within the range of from 65–85 percent by weight, preferably 70–80 percent.

Polymerization may be stopped at any desired point by use of conventional "short-stopping" agents such as are disclosed in U.S. Pat. No. 2,576,009.

Preferably, a lower tetraalkylthiuram disulfide can be used to stop polymerization and to initiate peptization. Since not all thiuram disulfides are equally active, it is customary to express the thiuram disulfide concentration in terms of activity of tetraethylthiuram disulfide. Equivalency curves can be readily obtained by simple experiments by one skilled in the art. The preferred concentration of thiuram disulfide is the equivalent of 0.8–1.2 parts tetraethylthiuram disulfide per 100 parts of total organic monomer in the initial emulsion. The thiuram disulfide can be conveniently added, for example, as a toluene solution emulsified in water.

At the same time as the thiuram disulfide is added, it is preferred that a free radical scavenger that does not react with the sulfide linkages of the sulfur-modified chloroprene copolymer be added to the latex. Representative free radical scavengers include phenothiazine, dihydric phenols, aralkyl derivatives thereof, and phenolic anti-oxidants substituted in at least one position ortho to the hydroxy group with a branched alkyl group containing 3–12 carbon atoms. Representative examples are hydroquinone, 2,5-di-tert-butylhydroquinone,
2,5-di-tert-amylhydroquinone,
4-tert-butylpyrocatechol,
4,4'-thiobis(2-methyl-6-tert-butyl phenol),
4,4'-methylenebis(2,6-di-tert-butylphenol),
2,6-di-tert-butyl-alpha-(methylamino)-p-cresol,
4,4'-thiobis(6-tert-butyl-m-cresol), and
2,6-di-tert-butyl-4-phenylphenol.

The water-soluble dialkyl dithiocarbamate salt which is next added to the polymer latex (preferably, as an aqueous solution) acts together with the thiuram disulfide to peptize the polymer within the latex as it ages. The degree of completion of peptization is determined as described in the Examples. To achieve the desired degree of peptization, it is necessary to use an amount of the dithiocarbamate equivalent to at least 0.7 parts of sodium dibutyl dithiocarbamate, preferably 0.8–1.2 parts per 100 parts monomer. Sodium dibutyl dithiocarbamate is chosen as the standard dialkyl dithiocarbamate, and equivalent amounts of other dialkyl dithiocarbamates (that is, amounts having equivalent activity) can be obtained experimentally in a simple manner.

Tetraalkylthiuram disulfides and water-soluble dialkyl dithiocarbamate salts useful in the practice of this invention are those in which the alkyl groups attached to the nitrogen atoms are acyclic alkyl groups, or where the two alkyl groups attached to the same nitrogen atom are connected to form an alpha, omega-alkylene group. Representative alpha, omega-alkylene groups include pentamethylene and tetramethylene, while representative alkyl groups include methyl, ethyl, butyl, and octyl. Typical compounds include, for example, dipentamethylenethiuram disulfide, tetramethylthiuram disulfide, sodium dioctyl dithiocarbamate, and sodium dibutyl dithiocarbamate.

The polymer peptization rate is dependent on the latex pH and temperature. This step can be carried out at about 15°–50° C., but ambient temperatures of about 23°–27° C. are preferred. The peptization rate increases with pH. The minimum practical pH is about 10. A degree of peptization of at least 60% of the theoretical maximum can usually be obtained in 10–30 hours.

Unreacted monomer can be stripped from the polymer latex anytime after "short-stopping" the polymerization and preferably during the peptization step, as described below in Example 1, the stripping time being counted as peptization time. As soon as the unreacted monomer has been removed, the latex is cooled to the peptization temperature.

The polymer is isolated by conventional methods such as are described in U.S. Pat. Nos. 2,187,146 and 2,914,497.

The dialkyl xanthogen disulfides which may be used in practicing this invention have the general formula

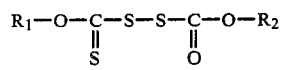

in which $R_1$ and $R_2$ are alkyl groups usually containing one to eight carbon atoms. Examples of suitable compounds are dimethyl xanthogen disulfide, diethyl xanthogen disulfide, diisopropyl xanthogen disulfide, dibutyl xanthogen disulfides, and bis(2-ethylhexyl) xanthogen disulfide. The preferred compounds are those in which the alkyl groups contain 2 to 4 carbon atoms. Diisopropyl xanthogen disulfide is especially preferred for use in the process.

The required amount of the different dialkyl xanthogen disulfides will vary with their molecular weight. Beyond that, there are differences in the extent of modification provided by equimolar amounts of different dialkyl xanthogen disulfides. For this reason, the amount of dialkyl xanthogen disulfide has been defined in terms of the effective amount of diisopropyl xanthogen disulfide, which effective amount is up to about 1.0 parts by weight per 100 parts of organic monomers. To determine the amounts of other dialkyl xanthogen disulfides equivalent to the amounts of diisopropyl xanthogen disulfide, one may compare the Mooney viscosities obtained by replacing diisopropyl xanthogen disulfide with equimolar amounts of the other dialkyl xanthogen disulfide. It is important to note that the term (P) in equation (2) hereinabove is specific to diisopropyl xanthogen disulfide. However, as indicated in the specification and claims, this invention covers the use of other dialkyl xanthogen disulfides in amounts equivalent to those calculated for diisopropyl xanthogen disulfide by the equation.

The amounts of elemental sulfur and dialkyl xanthogen disulfide are critical in preparing the sulfur-modified chloroprene copolymer described herein having Mooney viscosities of from 25–75. Equation (2) relates Mooney viscosity to temperature and to sulfur, dialkyl xanthogen disulfide and 2,3-dichloro-1,3-butadiene concentrations. As previously indicated, the temperature can be independently selected from the range of 273–298K which in turn sets the lower limit (X) for the amount of 2,3-dichloro-1,3-butadiene (A).

Once the values have been selected for the temperature and the amount of 2,3-dichloro-1,3-butadiene, amounts of elemental sulfur and dialkyl xanthogen disulfide can be calculated to provide a given Mooney viscosity. For a given 2,3-dichloro-1,3-butadiene concentration and temperature with the above prescribed ranges, all combinations of elemental sulfur and dialkyl xanthogen disulfide concentrations which give calculated Mooney viscosities by equation (2) of from 25–75 are meant to be covered, with the qualification that elemental sulfur must be at least 0.1 to provide the polysulfide linkages required for dynamic service. Because of experimental errors associated with the polymerization procedure and the determination of Mooney viscosity, the actual Mooney viscosity obtained for a polymer prepared by the process of this invention may differ from the value calculated by equation (2) by ±5 Mooney points. This will be discussed in detail in the Examples.

The polymers prepared by the process of this invention yield vulcanizates which exhibit substantially improved heat resistance when compared with commercially available grades of polychloroprene useful in dynamic applications such as power transmission belts. None of the other properties of the polychloroprene important for dynamic use such as flexibility, compression set, tear strength, and hardness are adversely affected. The sulfur-modified polychloroprene of this invention can be substituted for commercially available sulfur-modified polychloroprene currently used in the manufacture of power transmission belts such as automotive V-belts.

Since these novel polymers have improved heat-aging characteristics their service life in power transmission belts is significantly increased. As a result of the polymerization conditions and amounts of reactants employed, the polymers of this invention can be characterized by their content of units derived from 2,3-dichloro-1,3-butadiene, the proportion of units derived from 2-chloro-1,3-butadiene which have a 1,4-trans configuration and their curability with metal oxides alone. In the process of the present invention, the amount of 2,3-dichloro-1,3-butadiene used in the polymerization ranges from about 3 to 20 parts per 100 parts of 2-chloro-1,3-butadiene plus 2,3-dichloro-1,3-butadiene. Since 2,3-dichloro-1,3-butadiene is substantially more reactive than 2-chloro-1,3-butadiene ($r_1$, 2,3-dichloro-1,3-butadiene=1.5 and $r_2$, 2-chloro-1,3-butadiene=0.3), the dichlorobutadiene is incorporated into the polymer more rapidly than is the monochlorobutadiene. Because only 65 to 85% by weight of the total chlorobutadiene monomers charged is converted to polymer, the proportion of dichlorobutadiene in the isolated polymer is higher than the proportion of dichlorobutadiene in the diene monomers charged. For these reasons, the isolated polymer will contain between about 3–25% by weight and preferably 7–18% by weight of units derived from 2,3-dichloro-1,3-butadiene. The presence of units derived from 2,3-dichloro-1,3-butadiene can be shown by nuclear magnetic resonance (NMR) spectroscopy. The amount of dichlorobutadiene in the polymer can be determined by chlorine analysis, infrared (IR) spectroscopy and nuclear magnetic resonance (NMR) spectroscopy of a refined polymer sample.

The proportion of the units derived from 2-chloro-1,3-butadiene in the polymer which have a 1,4-trans configuration is a function of the temperature used during polymerization. Polymers prepared within the temperature range of 273–298K will have a 1,4-trans content of 92–96% based on the total number of units derived from 2-chloro-1,3-butadiene. The 1,4-trans content can be determined by carbon-13 nuclear magnetic resonance (NMR) spectroscopy, by the methods of Coleman, Tabb and Brame, *Rubber Chem. Technol.*, Vol. 50, (1977), pages 49–62 and Coleman and Brame, *Rubber Chem. Technol.*, Vol. 51, No. 4 (1978), pages 668–676.

Finally, the polymers of this invention are characterized by their good curability with metal oxides alone. Polychloroprene polymers prepared in the presence of chain terminators such as xanthogen disulfides and mercaptans and in the absence of sulfur yield only weak cures with metal oxides alone. Only those polymers prepared in the presence of a significant amount of sulfur, i.e., at least 0.1 parts, and subsequently peptized yield good cures with zinc and magnesium oxides providing vulcanizates having tensile strengths in excess of 10 MPa.

The following examples of certain embodiments are illustrative of the invention wherein all parts, proportions and percentages are by weight unless otherwise indicated.

EXAMPLES

The following ASTM test methods were used to determine the physical properties of the polychloroprene described in the examples.
Tensile at break ($T_B$) D412-80
Elongation at break ($E_B$) D412-80
Modulus at 100, 200 and 500% elongation
 ($M_{100}$, $M_{200}$, $M_{500}$) D412-80
Compression set, Method B D395-78
Hardness, Type A D2240-81
Mooney viscosity and Mooney scorch D1646-81
Accelerated heat aging by the oven method D573-81

The amount of 2,3-dichloro-1,3-butadiene in the copolymers may be determined by chlorine analysis of a refined polymer sample. The polymer is refined by dissolving it in toluene, precipitating the polymer with methanol containing about 0.1% octamine (octalylated diphenylamine), collecting the polymer by filtration and drying at reduced pressure in an inert atmosphere.

As previously mentioned the proportion of units in the polymer derived from 2-dichloro-1,3-butadiene that have a 1,4-trans configuration may be determined by the carbon-13 NMR Method of Coleman, Tabb and Brame, *Rubber Chem. Technol.*, Vol. 50, (1977), pages 49–62 and Coleman and Brame, *Rubber Chem. Technol.*, Vol. 51, No. 4 (1978), pages 668–676.

The degree of peptization expressed in terms of percent of the theoretical maximum is determined by milling 100 g of a sulfur-modified polymer (prepared substantially by the procedure described hereinafter in Example 1) with 1.0 g of Accelerator 552 (piperidinium pentamethylene dithiocarbamate) and 0.1 g of Octamine antioxidant (octylated diphenylamine) for 15 minutes at 40°–50° C. Accelerator 552 is a strong peptizing agent and cleaves substantially all of the remaining polysulfide linkages in the polymer. The Mooney viscosity (ML) is determined on the polymer before and after the milling operation. The percent peptization of the theoretical maximum is calculated by the following expression:

Peptization (% of theory) =

$$100 - \frac{(\text{Original } ML - \text{Milled } ML)}{\text{Original } ML} \times 100$$

EXAMPLE 1

A 5 liter five-necked, round bottom flask is charged with 1800 g of 2-chloro-1,3-butadiene, 200 g of 2,3-dichloro-1,3-butadiene, 4 g of sulfur, 9 g of diisopropyl xanthogen disulfide, 80 g of wood rosin, 2280 g of water, 15 g of sodium hydroxide, 4 g of a 60% aqueous solution of triethanolammonium dodecylbenzene sulfonate, 15 g sodium salt of a formaldehyde condensation product of naphthalene sulfonic acid, 1 g sodium formaldehyde sulfoxylate, 0.2 g of sodium 2-anthraquinone sulfonate and 2 ml of a 10 ppm copper sulfate solution. Polymerization is carried out in the nitrogen-blanketed, agitated flask at 288K by incrementally adding an aqueous solution containing 5% potassium persulfate and 0.125% sodium anthraquinone sulfonate. After reaching a conversion of 70% (indicated by an increase in the specific gravity of the latex from 0.997 to 1.073) the polymerization is stopped by adding 83 g of a stabilizer emulsion prepared from 27.5 parts of tetraethyl thiuram disulfide, 28.6 parts of water, 38.1 parts of toluene, 3.9 parts sodium lauryl sulfonate, 0.8 parts of the sodium salt of a condensate of formaldehyde and naphthalenesulfonic acid and 1.1 parts of 4,4'-thiobis(2-methyl-6-tertbutylphenol). Following the addition of the stabilizer emulsion, 40 g of a 47% aqueous solution of sodium dibutyl dithiocarbamate diluted with 40 g of water containing 4 g of sodium lauryl sulfonate is added. The temperature is adjusted to 298K and unpolymerized monomer consisting substantially of unreacted 2-chloro-1,3-butadiene is stripped from the latex with steam at reduced pressure. The latex is held for 16 hours at room temperature for peptization. The latex is adjusted to a pH of 5.6 with 30% aqueous acetic acid. The polymer is coagulated from the latex by the freeze-roll method described in U.S. Pat. No. 2,187,146 and washed and dried. The Mooney viscosity of the isolated polymer is ML 1+4' (100° C.)=46. The Mooney viscosity calculated by equation (2) is 43. The percent peptization is about 70 as determined by milling with Accelerator 552 as described above. The polymer contains about 14% of units derived from 2,3-dichloro-1,3-butadiene and of the units derived from 2-chloro-1,3-butadiene 94% have a 1,4-trans configuration based on the data of the above-identified Coleman, Tabb and Brame, and Coleman and Brame publications. When cured for 30 minutes at 160° C. with 4 parts MgO and 5 part ZnO the resulting vulcanizate has a tensile strength of 20 MPa.

EXAMPLE 2

A series of 34 polymerizations are run substantially by the procedure described in Example 1; however, the amounts of elemental sulfur (S), diisopropyl xanthogen disulfide (P) and 2,3-dichloro-1,3-butadiene (A) and the temperature (T) are varied as shown in Table I. It should be noted that if a given polymerization could not be initiated by the addition of increments of a solution of 5% potassium persulfate and 0.125% sodium anthraquinone sulfate, increments of an aqueous solution of 5% sodium hydrosulfite are also added. As known by those skilled in the art, excessive amounts of persulfate solution should not be added while trying to initiate polymerization since it may be impossible to control the temperature once polymerization starts if the system contains excessive amounts of catalyst.

The observed Mooney viscosities obtained for each of the products of these runs is also listed in Table I. The data from all of these runs were used to derive equation (2) using the mathematical Modeling Laboratory (MLAB) computer program developed by Gary Knott and Douglas Reece of the National Institutes of Health. The Mooney viscosities calculated by equation (2) are also listed in Table I. While there are substantial discrepancies between calculated and observed Mooney viscosities for a few of the runs, for about 75% of the runs the difference between calculated and observed viscosities is 5 Mooney points or less. This degree of reproducibility, that is, about ±5 Mooney points, is typical when a given polymer preparation is repeated by one skilled in laboratory preparation of polychloroprene polymers.

TABLE I

| Run No | (S) | (P) | (T) | (A) | (ML, CALC) | (ML, OBS) |
|---|---|---|---|---|---|---|
| 1 | 0.100 | 0.500 | 283 | 10 | 60 | 60 |
| 2 | 0.100 | 0.500 | 283 | 10 | 60 | 65 |
| 3 | 0.200 | 0.450 | 283 | 10 | 46 | 49 |
| 4 | 0.200 | 0.500 | 283 | 10 | 41 | 44 |
| 5 | 0.200 | 0.450 | 288 | 10 | 42 | 46 |
| 6 | 0.300 | 0 | 283 | 10 | 88 | 92 |
| 7* | 0.350 | 0 | 283 | 10 | 72 | 62 |
| 8 | 0.350 | 0.150 | 283 | 10 | 51 | 44 |
| 9 | 0.350 | 0.200 | 283 | 10 | 45 | 37 |
| 10 | 0.350 | 0.250 | 283 | 10 | 40 | 36 |
| 11 | 0.350 | 0.250 | 283 | 10 | 40 | 32 |
| 12 | 0.350 | 0.300 | 283 | 10 | 36 | 30 |
| 13 | 0.350 | 0.350 | 283 | 10 | 32 | 27 |
| 14 | 0.350 | 0.150 | 288 | 10 | 47 | 45 |
| 15 | 0.350 | 0.100 | 293 | 10 | 50 | 50 |
| 16* | 0.350 | 0.050 | 303 | 10 | 49 | 48 |
| 17* | 0.350 | 0.025 | 313 | 10 | 45 | 44 |
| 18 | 0.400 | 0 | 283 | 10 | 59 | 73 |
| 19 | 0.400 | 0 | 283 | 10 | 59 | 58 |
| 20 | 0.410 | 0 | 288 | 10 | 53 | 58 |
| 21 | 0.450 | 0.050 | 288 | 10 | 40 | 37 |
| 22 | 0.500 | 0 | 283 | 10 | 40 | 51 |
| 23 | 0.500 | 0 | 288 | 10 | 37 | 32 |
| 24 | 0.525 | 0 | 283 | 10 | 36 | 34 |
| 25 | 0.550 | 0 | 288 | 10 | 30 | 28 |
| 26 | 0.600 | 0 | 283 | 10 | 27 | 34 |
| 27 | 0.600 | 0 | 283 | 10 | 27 | 29 |
| 28 | 0.500 | 0 | 283 | 5 | 35 | 40 |
| 29 | 0.480 | 0 | 293 | 7.5 | 35 | 40 |
| 30* | 0.410 | 0 | 303 | 4.5 | 37 | 32 |
| 31 | 0.480 | 0 | 293 | 7.5 | 35 | 32 |
| 32* | 0.410 | 0 | 303 | 4.5 | 37 | 40 |
| 33* | 0.350 | 0 | 318 | 0 | 34 | 35 |

TABLE I-continued

| Run No | (S) | (P) | (T) | (A) | (ML, CALC) | (ML, OBS) |
|---|---|---|---|---|---|---|
| 34* | 0.375 | 0 | 283 | 0 | 49 | 47 |

*These runs are outside the scope of the invention. All the data above were used to establish equation (2).

EXAMPLE 3

Three polychloroprene polymers are prepared substantially by the procedure described in Example 1 except for the changes listed in Table II.

TABLE II

| Polymer | A | B | C |
|---|---|---|---|
| 2,3-Dichloro-1,3-butadiene, pph* | 10 | 10 | 10 |
| Temperature, K. | 313 | 283 | 283 |
| Sulfur, pph | 0.6 | 0.4 | 0.2 |
| Diisopropyl xanthogen disulfide, pph | — | — | 0.45 |
| Conversion, % | 74 | 68 | 69 |

*pph means parts per 100 parts chlorobutadiene monomers

Comparative Polymer A is a sulfur-modified polychloroprene prepared at 313K (40° C.) which temperature is in the range generally used for the commercial preparation of polychloroprene. Polymer A is outside the scope of the present invention. Polymer A has a Mooney ML 1+4' (100° C.) of 30. Polymers B and C have ML 1+4' (100° C.) values of 58 and 49, respectively, and calculated Mooney values of 59 and 46, respectively. They contain about 14% of units derived from 2,3-dichloro-1,3-butadiene and of the units derived from 2-chloro-1,3-butadiene 94% have a 1,4-trans configuration based on data of the above-identified Coleman, Tabb and Brame and Coleman and Brame publications.

The three polymers are compounded with the curing ingredients shown in Table III. The Mooney scorch on the uncured compounds and the properties of the cured elastomers before and after aging are also listed in Table III.

TABLE III

| Polymer Sample | A | B | C |
|---|---|---|---|
| Polymer, parts | 100 | 100 | 100 |
| Octamine (dioctyl diphenylamine), parts | 0.5 | 0.5 | 0.5 |
| Stearic acid, parts | 0.5 | 0.5 | 0.5 |
| Magnesia, parts | 4 | 4 | 4 |
| Zinc oxide, parts | 5 | 5 | 5 |
| Mooney Scorch at 121° C. | | | |
| Minimum Mooney | 13 | 28 | 22 |
| Minutes to 10 point rise | >30 | >30 | >30 |
| Cured 160° C./30' | | | |
| $M_{100}$, MPa | 1.0 | 1.0 | 1.0 |
| $M_{300}$, MPa | 2.1 | 1.9 | 1.6 |
| $M_{500}$, MPa | 3.4 | 3.8 | 2.8 |
| $T_B$, MPa | 15.9 | 22.8 | 24.8 |
| $E_B$, % | 830 | 915 | 975 |
| Compression Set | | | |
| 22/100° C. | 36 | 31 | 37 |
| 24/−10° C. | 18 | 19 | 26 |
| Heat Aged 7 Days/121° C. | | | |
| $M_{100}$, MPa | 2.1 | 1.7 | 1.7 |
| $M_{300}$, MPa | 4.5 | 4.1 | 3.1 |
| $T_B$, MPa (% Retention) | 6.9(43) | 19.3(85) | 20.7(83) |
| $E_B$, % (% Retention) | 830(47) | 585(64) | 660(68) |
| (% Retention of tensile product, $T_B \times E_B$) | (20) | (54) | (56) |

The superiority of the polymers of this invention (B and C) relative to the Comparative Polymer A on heat aging is clearly evident from the data in Table III. The Mooney scorch data indicates the polymers have good processing safety. The compression set data at −10° C. indicates that all of the polymers have acceptable low temperature properties.

EXAMPLE 4

Two polychloroprene polymers (A and B) are prepared substantially by the procedure of Example 1 with the exceptions noted below. Polymer A is representative of this invention and is prepared at 283K using 10 pph 2,3-dichloro-1,3-butadiene, (pph means parts per 100 parts chlorobutadiene monomers) and 0.525 pph sulfur. It has a Mooney viscosity, ML 1+4' (100° C.) of 34 (calc=36). Polymer B is representative of a sulfur-modified polychloroprene useful for the manufacture of automotive V-belts. Polymer B is prepared in the presence of sulfur at 313K with 2 pph of 2,3-dichlorobutadiene. Polymer B has a Mooney ML 1+4' (100° C.) of 45. Polymer A of this invention contains about 14% of units derived from 2,3-dichlorobutadiene, and of the units derived from 2-chloro-1,3-butadiene about 94% have a 1,4-trans configuration based on the data of the above identified Coleman, Tabb and Brame, and Coleman and Brame publications.

The two polymers are milled with the compounding ingredients listed in Table IV to prepare typical black stocks suitable for use in automotive V-belts. The resulting compositions are cured for 30 minutes at 160° C. and exhibit properties before and after aging which are also listed in Table IV.

TABLE IV

| | Polymer A | Comparative Polymer B |
|---|---|---|
| Polymer, parts | 100 | 100 |
| Octamine (Dioctyl diphenylamine), parts | 2 | 2 |
| Stearic acid, parts | 0.5 | 0.5 |
| N-774 Carbon black, parts | 25 | 25 |
| Magnesia, parts | 4 | 4 |
| Zinc oxide, parts | 5 | 5 |
| Cured 160/30' | | |
| Compression set, % | | |
| 22 hours/100° C. | 20 | 44 |
| 24 hours/−10° C. | 38 | 39 |
| $M_{100}$, MPa | 1.2 | 1.4 |
| $M_{200}$, MPa | 2.8 | 3.4 |
| $T_B$, MPa | 14.8 | 12.8 |
| $E_B$, % | 670 | 500 |
| % Retention After Heat Aging at 121° C./7 days | | |
| $M_{100}$ | 392 | 493 |
| $M_{200}$ | 393 | — |
| $T_B$ | 144 | 91 |
| $E_B$ | 57 | 32 |
| $T_B \times E_B$ | 82 | 29 |
| % Retention After Heat Aging at 130° C./7 days | | |
| $M_{100}$ | 692 | — |
| $M_{200}$ | — | — |
| $T_B$ | 103 | 65 |
| $E_B$ | 28 | 16 |
| $T_B \times E_B$ | 29 | 10 |

The superiority of Polymer A of this invention relative to Comparative Polymer B on heat aging at 121° C. and 130° C. is clearly evident from the data in Table IV.

I claim:

1. A process for preparing a heat resistant sulfur-modified polychloroprene copolymer containing about 3-25% by weight of units derived from 2,3-dichloro- 1,3-butadiene and units derived from 2-chloro-1,3-butadiene wherein about 92–96% by weight of said units have a 1,4-trans configuration, said polychloroprene having a calculated Mooney viscosity ML 1+4' (100° C.), of from about 25–75 which comprises (I) emulsion polymerizing a mixture of 2-chloro-1,3-butadiene and 2,3-dichloro-1,3-butadiene to a total conversion of from about 65–85% by weight and at a temperature (T) in the range of from about 273–298K, said 2,3-dichloro-1,3-butadiene being employed in an amount of at least X parts to 20 parts per 100 parts 2-chloro-1,3-butadiene plus 2,3-dichloro-1,3-butadiene wherein $$X = 48.734 - 0.15325K, \quad (1)$$

said calculated Mooney viscosity of the resulting polychloroprene copolymer within the range of 25–75 being obtained by employing amounts of from 0.1–0.62 parts elemental sulfur (S), up to 1.0 parts diisopropyl xanthogen disulfide (P) or an equivalent amount of another dialkyl xanthogen disulfide, and 2,3-dichloro-1,3-butadiene (A), said (S), (P) and (A) expressed as parts per 100 parts of said 2-chloro-1,3-butadiene plus 2,3-dichloro-1,3-butadiene, at a given temperature of polymerization (T), expressed by the following equation:

$$ML\ 1 + 4'\ (100°\ C.) = \quad (2)$$
$$(11129.1)e^{(-3.97385S - 2.34837P - .0138807T + .0281227A)},$$

and (II) pepitizing the resulting polychloroprene copolymer latex to at least 60% of the theoretical maximum.

2. A process of claim 1 wherein the amount of diisopropyl xanthogen disulfide (P) or an equivalent amount of another dialkyl xanthogen disulfide in equation (2) is zero.

3. A process of claim 1 wherein the dialkyl xanthogen disulfide is diisopropyl xanthogen disulfide.

4. A process of claims 1 or 2 wherein said calculated Mooney viscosity of the polychloroprene copolymer is from 35–55.

5. A process of claims 1 or 2 wherein the amount of 2,3-dichloro-1,3-butadiene (A) is from about 7 to 15 parts per 100 parts of said chlorobutadiene monomers.

6. A process of claims 1 or 2 wherein the temperature (T) in equation (2) is from 283–293K.

7. A heat resistant sulfur-modified polychloroprene copolymer made by the process of claim 1.

8. A heat resistant sulfur modified polychloroprene copolymer made by the process of claim 2.

9. A heat resistant sulfur modified polychloroprene copolymer made by the process of claim 3.

* * * * *